United States Patent
Wei et al.

(10) Patent No.: US 11,604,633 B2
(45) Date of Patent: Mar. 14, 2023

(54) TRUSTED STARTUP METHODS AND APPARATUSES OF BLOCKCHAIN INTEGRATED STATION

(71) Applicant: ALIPAY (HANGZHOU) INFORMATION TECHNOLOGY CO., LTD., Zhejiang (CN)

(72) Inventors: Changzheng Wei, Hangzhou (CN); Ying Yan, Hangzhou (CN); Hui Zhang, Hangzhou (CN); Lei Wang, Hangzhou (CN)

(73) Assignee: Alipay (Hangzhou) Information Technology Co., Ltd., Zhejiang (CN)

( * ) Notice: Subject to any disclaimer, the term of this patent is extended or adjusted under 35 U.S.C. 154(b) by 0 days.

(21) Appl. No.: 17/361,247

(22) Filed: Jun. 28, 2021

(65) Prior Publication Data
US 2021/0344506 A1    Nov. 4, 2021

(30) Foreign Application Priority Data

Jul. 8, 2020    (CN) .......................... 202010653803.2

(51) Int. Cl.
*H04L 9/32*   (2006.01)
*H04L 9/30*   (2006.01)
(Continued)

(52) U.S. Cl.
CPC ............ *G06F 8/63* (2013.01); *G06F 16/2365* (2019.01); *G06F 21/44* (2013.01); *G06F 21/51* (2013.01);
(Continued)

(58) Field of Classification Search
CPC ....... H04L 9/3247; H04L 9/30; H04L 9/3236; H04L 67/10; H04L 2209/38; H04L 63/12;
(Continued)

(56) References Cited

U.S. PATENT DOCUMENTS 7,529,919 B2   5/2009   Lampson et al.
8,116,455 B1   2/2012   Sussland et al.
(Continued)

FOREIGN PATENT DOCUMENTS

CN    104200154    12/2014
CN    105320891    2/2016
(Continued)

OTHER PUBLICATIONS

"Decentralized Storage System for Edge Computing"; Alin-Gabriel Gheorghe, Constantin-Cosmin Crecana, Catalin Negru, Florin Pop, Ciprian Dobre; 2019 18th International Symposium on Parallel and Distributed Computing (ISPDC) pp. 41-49; (Year: 2019).*

(Continued)

*Primary Examiner* — John W Hayes
*Assistant Examiner* — Edgar R. Martinez-Hernandez
(74) *Attorney, Agent, or Firm* — Fish & Richardson P.C.

(57) ABSTRACT

A blockchain integrated station receives a startup instruction. The blockchain integrated station sends a signature verification request for a disk image stored in the blockchain integrated station to a cryptographic acceleration card included in the blockchain integrated station. The blockchain integrated station receives a signature verification result from the cryptographic acceleration card, where the signature verification result indicates whether a signature of the disk image passes a verification. In response to determining that the signature verification result indicates that the signature of the disk image passes the verification, the blockchain integrated station executes the disk image.

21 Claims, 3 Drawing Sheets

(51) Int. Cl.

| | |
|---|---|
| *H04L 9/00* | (2022.01) |
| *G06Q 30/00* | (2012.01) |
| *G06F 8/61* | (2018.01) |
| *H04L 9/40* | (2022.01) |
| *H04L 67/104* | (2022.01) |
| *G06F 21/64* | (2013.01) |
| *G06F 21/62* | (2013.01) |
| *G06F 21/51* | (2013.01) |
| *G06F 21/44* | (2013.01) |
| *G06F 16/23* | (2019.01) |
| *H04L 67/1095* | (2022.01) |
| *H04L 67/10* | (2022.01) |
| *G06F 21/60* | (2013.01) |
| *G06F 21/57* | (2013.01) |
| *G06F 16/27* | (2019.01) |
| *G06Q 30/018* | (2023.01) |

(52) U.S. Cl.
CPC .......... *G06F 21/6245* (2013.01); *G06F 21/64* (2013.01); *H04L 9/30* (2013.01); *H04L 9/3236* (2013.01); *H04L 9/3247* (2013.01); *H04L 63/12* (2013.01); *H04L 67/104* (2013.01); *G06F 16/27* (2019.01); *G06F 21/575* (2013.01); *G06F 21/602* (2013.01); *G06Q 30/018* (2013.01); *G06Q 2220/10* (2013.01); *H04L 9/50* (2022.05); *H04L 67/10* (2013.01); *H04L 67/1095* (2013.01)

(58) Field of Classification Search
CPC ..... H04L 67/104; H04L 9/50; H04L 67/1095; G06F 16/27; G06F 8/63; G06F 16/2365; G06F 21/44; G06F 21/51; G06F 21/6245; G06F 21/64; G06F 21/575; G06F 21/602; G06Q 30/018; G06Q 2220/10
See application file for complete search history.

(56) References Cited

U.S. PATENT DOCUMENTS

| | | | |
|---|---|---|---|
| 8,171,285 B2 | 5/2012 | Platt | |
| 8,239,686 B1 | 8/2012 | Hodzic et al. | |
| 9,009,840 B1* | 4/2015 | Stickle | G06F 21/12 |
| | | | 726/17 |
| 9,336,395 B2 | 5/2016 | Berlin | |
| 9,634,951 B1* | 4/2017 | Hunt | H04L 47/50 |
| 10,075,439 B1* | 9/2018 | Mullens | H04L 63/126 |
| 10,313,257 B1* | 6/2019 | Hunt | H04L 9/3263 |
| 10,642,984 B2 | 5/2020 | Heagney | |
| 11,144,652 B1 | 10/2021 | Cochell et al. | |
| 2003/0074567 A1* | 4/2003 | Charbonneau | G06F 21/57 |
| | | | 713/186 |
| 2003/0196110 A1 | 10/2003 | Lannpson et al. | |
| 2006/0015717 A1 | 1/2006 | Liu et al. | |
| 2006/0026569 A1 | 2/2006 | Oerting et al. | |
| 2006/0150256 A1 | 7/2006 | Fanton et al. | |
| 2007/0118730 A1 | 5/2007 | Platt | |
| 2008/0256363 A1* | 10/2008 | Balacheff | G06F 21/572 |
| | | | 713/187 |
| 2009/0249324 A1 | 10/2009 | Brar et al. | |
| 2012/0084414 A1 | 4/2012 | Brock et al. | |
| 2014/0013325 A1* | 1/2014 | Shimoni | G06F 9/45558 |
| | | | 718/1 |
| 2014/0181057 A1 | 6/2014 | Euresti et al. | |
| 2014/0181975 A1* | 6/2014 | Spernow | G06F 21/552 |
| | | | 726/23 |
| 2014/0215196 A1 | 7/2014 | Berlin | |
| 2015/0067805 A1* | 3/2015 | Martin | H04L 67/1095 |
| | | | 726/7 |
| 2016/0070934 A1 | 3/2016 | Frank et al. | |
| 2016/0103689 A1* | 4/2016 | Sanghi | G06F 11/1471 |
| | | | 710/313 |
| 2016/0366229 A1* | 12/2016 | Yamaura | H04L 67/56 |
| 2017/0099604 A1* | 4/2017 | Raleigh | H04L 41/046 |
| 2017/0147356 A1* | 5/2017 | Kotary | G06F 9/4401 |
| 2017/0235950 A1* | 8/2017 | Gopalapura Venkatesh | |
| | | | G06F 9/4406 |
| | | | 726/24 |
| 2017/0295023 A1 | 10/2017 | Madhavan et al. | |
| 2018/0103018 A1 | 4/2018 | Chauhan et al. | |
| 2018/0198620 A1* | 7/2018 | Pearson | H04L 9/3247 |
| 2018/0225459 A1 | 8/2018 | Zarakas et al. | |
| 2018/0314827 A1* | 11/2018 | Wells | G06F 9/45558 |
| 2018/0367528 A1* | 12/2018 | Schwarz | H04L 63/08 |
| 2019/0065709 A1* | 2/2019 | Salomon | G06F 21/44 |
| 2019/0278925 A1* | 9/2019 | Ely | G06F 21/64 |
| 2019/0305957 A1 | 10/2019 | Reddy et al. | |
| 2019/0306173 A1 | 10/2019 | Reddy et al. | |
| 2019/0340379 A1* | 11/2019 | Beecham | G06F 16/9014 |
| 2019/0394648 A1 | 12/2019 | Tipton et al. | |
| 2020/0012527 A1 | 1/2020 | Hartsock | |
| 2020/0136808 A1 | 4/2020 | Chasko et al. | |
| 2020/0159625 A1* | 5/2020 | Hutcheson | G06F 11/1461 |
| 2020/0160289 A1 | 5/2020 | Mahajan et al. | |
| 2020/0204510 A1 | 6/2020 | Pierce et al. | |
| 2020/0322153 A1* | 10/2020 | Cai | H04W 12/104 |
| 2020/0341702 A1 | 10/2020 | Kosaka | |
| 2020/0412521 A1 | 12/2020 | Shi | |
| 2021/0037060 A1 | 2/2021 | Robison et al. | |
| 2021/0099311 A1 | 4/2021 | Saponaro et al. | |
| 2021/0167971 A1* | 6/2021 | Zhang | G06Q 20/3825 |
| 2021/0279072 A1* | 9/2021 | Lee | G06F 9/4406 |
| 2021/0328767 A1 | 10/2021 | Wei et al. | |
| 2021/0328773 A1* | 10/2021 | Wei | G06F 21/64 |
| 2021/0344506 A1* | 11/2021 | Wei | H04L 9/3236 |

FOREIGN PATENT DOCUMENTS

| | | | | |
|---|---|---|---|---|
| CN | 106156635 | | 11/2016 | |
| CN | 106295318 | | 1/2017 | |
| CN | 106506163 | | 3/2017 | |
| CN | 106599729 | | 4/2017 | |
| CN | 107077557 | | 8/2017 | |
| CN | 108229142 A | | 6/2018 | |
| CN | 108305072 | | 7/2018 | |
| CN | 108648079 | | 10/2018 | |
| CN | 109309651 | | 2/2019 | |
| CN | 109375944 | | 2/2019 | |
| CN | 109491694 | | 3/2019 | |
| CN | 109634619 | | 4/2019 | |
| CN | 109685502 | | 4/2019 | |
| CN | 109784058 | | 5/2019 | |
| CN | 109788032 | | 5/2019 | |
| CN | 110149316 | | 8/2019 | |
| CN | 110287170 | | 9/2019 | |
| CN | 110502268 | | 11/2019 | |
| CN | 110535654 | | 12/2019 | |
| CN | 110535938 | | 12/2019 | |
| CN | 110852734 | | 2/2020 | |
| CN | 110855791 | | 2/2020 | |
| CN | 110989994 | | 4/2020 | |
| CN | 110995480 A | | 4/2020 | |
| CN | 111143854 | | 5/2020 | |
| CN | 111259348 A | | 6/2020 | |
| CN | 111277553 A | | 6/2020 | |
| CN | 111414612 | | 7/2020 | |
| CN | 111581277 A | | 8/2020 | |
| EP | 3107246 A1 * | | 12/2016 | G06F 8/63 |
| EP | 3628087 A2 | | 4/2020 | |
| WO | WO-2016107394 A1 * | | 7/2016 | G06F 21/10 |
| WO | WO 2018081583 | | 5/2018 | |
| WO | 2019120315 A2 | | 6/2019 | |

OTHER PUBLICATIONS

"A Blockchain-Based Secure Image Encryption Scheme for the Industrial Internet of Things"; Prince Waqas Khan and Yungcheol Byun; Entropy; (Year: 2020).*

"Towards Blockchain for Decentralized Self-Organizing Wireless Networks"; Steven Platt, Miquel Oliver; (Year: 2019).*

(56) References Cited

OTHER PUBLICATIONS

Crosby et al., "BlockChain Technology: Beyond Bitcoin," Sutardja Center for Entrepreneurship & Technology Technical Report, Oct. 16, 2015, 35 pages.
Nakamoto, "Bitcoin: A Peer-to-Peer Electronic Cash System," www.bitcoin.org, 2005, 9 pages.
Extended European Search Report in European Appln. No. 21181654.1, dated Dec. 8, 2021, 10 pages.
Extended European Search Report in European Appln. No. 21182249.9, dated Dec. 6, 2021, 8 pages.
Menezes et al., Handbook of Applied Cryptography, 1st ed., CRC Press, Dec. 1997, Chapter 12, 54 pages.
Xu et al., "Comments on the SM2 Key Exchange Protocol," ICIAP: International Conference on Image Analysis and Processing, 17th International Conference, Dec. 10, 2011, 160-171.
Extended European Search Report in European Appln No. 21179695.8, dated Nov. 17, 2021, 8 pages.

* cited by examiner

TRUSTED STARTUP METHODS AND APPARATUSES OF BLOCKCHAIN INTEGRATED STATION

CROSS-REFERENCE TO RELATED APPLICATIONS

This application claims priority to Chinese Patent Application No. 202010653803.2, filed on Jul. 8, 2020, which is hereby incorporated by reference in its entirety.

TECHNICAL FIELD

The present disclosure relates to the field of blockchain technologies, and in particular to trusted startup methods and apparatuses of a blockchain integrated station.

BACKGROUND

Blockchain technology (also called distributed ledger technology) is a decentralized distributed database technology having many characteristics such as decentralization, openness, transparency, immutability and trustability and the like, and thus it is applicable to many application scenarios with high demands for data reliability.

SUMMARY

In view of this, one or more embodiments of the present disclosure provide trusted startup methods and apparatuses of a blockchain integrated station.

To achieve the above-mentioned object, one or more embodiments of the present disclosure provide the following technical solution:

According to a first aspect of one or more embodiments of the present disclosure, provided is a trusted startup method of a blockchain integrated station, including:

initiating, by the blockchain integrated station, a signature verification request for a disk image deployed in the blockchain integrated station to a cryptographic acceleration card assembled on the blockchain integrated station in response to receiving a startup instruction, wherein a provider public key of a provider of the disk image is pre-stored in the cryptographic acceleration card;

receiving, by the blockchain integrated station, a signature verification result returned by the cryptographic acceleration card, wherein the signature verification result is obtained by the cryptographic acceleration card verifying a current signature of the disk image using the provider public key;

executing, by the blockchain integrated station, the disk image deployed in the blockchain integrated station to form a blockchain node in a case that the signature verification result indicates the current signature passes verification.

According to a second aspect of one or more embodiments of the present disclosure, provided is a trusted startup method of a blockchain integrated station, including:

receiving, by a cryptographic acceleration card assembled on the blockchain integrated station, a signature verification request initiated by the blockchain integrated station for a disk image deployed in the blockchain integrated station, wherein a provider public key of a provider of the disk image is pre-stored in the cryptographic acceleration card;

verifying, by the cryptographic acceleration card, a current signature of the disk image using the provider public key, and returning an obtained signature verification result to the blockchain integrated station, such that the blockchain integrated station executes the disk image deployed in the blockchain integrated station to form a blockchain node in a case that the signature verification result indicates the current signature passes verification.

According to a third aspect of one or more embodiments of the present disclosure, provided is a trusted startup apparatus of a blockchain integrated station, including:

a request sending module, configured to enable the blockchain integrated station to initiate a signature verification request for a disk image deployed in the blockchain integrated station to a cryptographic acceleration card assembled on the blockchain integrated station in response to receiving a startup instruction, wherein a provider public key of a provider of the disk image is pre-stored in the cryptographic acceleration card;

a result receiving module, configured to enable the blockchain integrated station to receive a signature verification result returned by the cryptographic acceleration card, wherein the signature verification result is obtained by the cryptographic acceleration card verifying a current signature of the disk image using the provider public key;

an image executing module, configured to enable the blockchain integrated station to execute the disk image deployed in the blockchain integrated station to form a blockchain node in a case that the signature verification result indicates the current signature passes verification.

According to a fourth aspect of one or more embodiments of the present disclosure, provided is a trusted startup apparatus of a blockchain integrated station, including:

a request receiving module, configured to enable a cryptographic acceleration card assembled on the blockchain integrated station to receive a signature verification request initiated by the blockchain integrated station for a disk image deployed in the blockchain integrated station, wherein a provider public key of a provider of the disk image is pre-stored in the cryptographic acceleration card;

an image verifying module, configured to enable the cryptographic acceleration card to verify a current signature of the disk image using the provider public key, and return an obtained signature verification result to the blockchain integrated station, such that the blockchain integrated station executes the disk image deployed in the blockchain integrated station to form a blockchain node in a case that the signature verification result indicates the current signature passes verification.

According to a fifth aspect of one or more embodiments of the present disclosure, provided is a blockchain integrated station, including:

a processor;

a memory for storing processor executable instructions;

wherein the processor implements the method according to the first aspect by running the executable instructions.

According to a sixth aspect of one or more embodiments of the present disclosure, provided is a cryptographic acceleration card, including:

a processor;

a memory for storing processor executable instructions;

wherein the processor implements the method according to the second aspect by running the executable instructions.

According to a seventh aspect of one or more embodiments of the present disclosure, provided is a computer readable storage medium having computer instructions stored thereon, wherein the instructions are executed by a processor to implement steps in the method according to the first or second aspect.

DETAILED DESCRIPTION OF THE EMBODIMENTS

Figure 1:
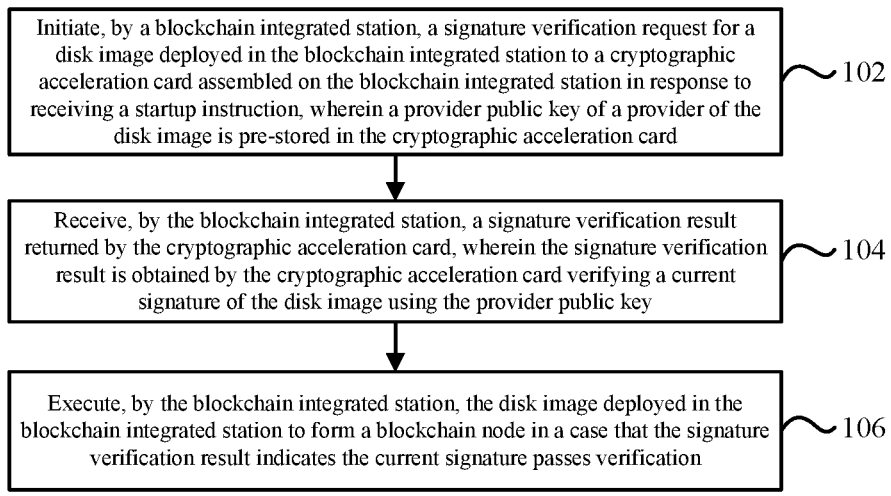
FIG. 1 is a flowchart of a trusted startup method of a blockchain integrated station according to example embodiments of the present disclosure.

Example embodiments will be described in detail herein with the example embodiments thereof expressed in the drawings. When the following descriptions involve the drawings, same numbers in different drawings represent same or similar elements unless stated otherwise. The implementations described in the following example embodiments do not represent all implementations consistent with one or more embodiments of the present disclosure. On the contrary, they are merely embodiments of apparatuses and methods consistent with some aspects of one or more embodiments of the present disclosure described in detail in the appended claims.

It should be noted that the steps of corresponding method are not necessarily performed according to the sequence shown in the present disclosure in other embodiments. In some other embodiments, the steps included in the corresponding method can be more or less than described in the specification. Further, a single step described in the specification may be divided into several steps for descriptions in other embodiments while several steps described in the specification can be combined into a single step for descriptions in other embodiments.

In the early stage of development of the blockchain technology, users mostly add their own personal computer (PC) and laptop computer and the like into a blockchain network to become a blockchain node in the blockchain network. At this time, the stage can be called 1.0 architecture era of blockchain network, in which the behaviors of users to participate in the blockchain network are autonomous and the users also need to perform autonomous maintenance, for example, perform maintenance and configuration and so on for their devices (for example, PC) participating in the blockchain network. Along with continuous development of the blockchain technology, especially along with increasing needs of users for infrastructures with high performance and high availability, the blockchain network develops into 2.0 architecture era based on cloud service. In the 2.0 architecture era, Blockchain-as-a-Service (BaaS) provides fast and convenient solutions for fast blockchain deployment and technical implementation and supports a large number of blockchain service projects. Generally, BaaS is built on infrastructures such as public cloud or private cloud, which introduces heavy dependence on infrastructure as well as providing strong deployment capability. However, because blockchain is a typical distributed computing technology, not all nodes can be migrated to clouds but privatization deployment is needed. The additional technical migration and maintenance costs brought by the privatization deployment cause inconsistent technical interfaces and high deployment and maintenance costs during an actual implementation. Therefore, to satisfy the needs of users for privatization and security and the like of the blockchain network, it is necessary to perform further architecture upgrade to the blockchain network, thereby realizing 3.0 architecture era based on blockchain integrated station.

Software and hardware integration can be realized for the blockchain integrated station. When providing a blockchain integrated station, a provider will not only provide hardware devices of the blockchain integrated station to users but also provide software configurations for realizing deep optimizations of the hardware devices integrated into the blockchain integrated station, thereby realizing the software-hardware integration.

Hardware optimization can be realized for the blockchain integrated station. For example, a dedicated smart contract processing chip can be deployed on the blockchain integrated station. For example, the smart contract processing chip can be Field Programmable Gate Array (FPGA) chip, or another type of chip to increase the processing efficiency for a smart contract. A hardware root-of-trust key can be deployed on the smart contract processing chip, for example, the hardware root-of-trust key can be pre-programmed by the provider into the smart contract processing chip and the provider can also know a public key corresponding to the hardware root-of-trust key (for example, the key is disclosed). Therefore, the smart contract processing chip can send negotiation information to the provider and sign the negotiation information by using the hardware root-of-trust key, so that the provider can verify the signature based on the corresponding public key; and, after successful signature verification, it is ensured that the smart contract processing chip and the provider obtain the same key through negotiation based on the negotiation information. The negotiated key can include an image deployment key, and thus the provider can encrypt and transmit a binary disk image needed by the blockchain node to the smart contract processing chip based on the image deployment key, and the smart contract processing chip can decrypt and deploy the binary disk image based on the image deployment key. The negotiated key can include a service secret deployment key, and thus the provider can encrypt and transmit a node private key of the blockchain node, a service root key of the blockchain node, etc., to the smart contract processing chip based on the service secret deployment key, and the smart contract processing chip can obtain and deploy the node private key and the service root key and the like based on the service secret deployment key to satisfy the privacy transaction needs in a blockchain scenario. For example, the node private key corresponds to a node public key, and thus a client device can perform encryption and transmission for a blockchain transaction by using the node public key, and the blockchain node can perform decryption by using the node private key. The service root key is a symmetric key which can be used to perform encrypted storage for service data such as contract codes and value of contract status and the like. The service root key may not be directly used, and the smart contract processing chip can perform encryption and decryption through a derivation key of the service root key to reduce the security risk of the service root key. Through reliable management for the node private key and the service root key (or its derivation key), data will be always in encrypted state unless processed by the smart contract processing chip. Therefore, the smart contract processing chip actually forms a Trusted Execution Environment (TEE) of hardware on the blockchain integrated station, so as to ensure the data requiring privacy protection such as transactions, contract codes, and contract statuses will not be leaked.

For another example, an intelligent network card can be deployed on the blockchain integrated station. In addition to realizing a traditional network card function, the intelligent network card also can replace or assist a CPU of the blockchain integrated station to perform partial functions so as to offload computation of the CPU. Especially, the operations with intensive network I/O can be transferred from CPU to the intelligent network card to perform, so that the CPU can process more computation-intensive operations, for example, transaction processing, and storage processing and the like. Compared with other components (for example, CPU) on the blockchain integrated station, the intelligent network card is closer to the network regardless of physical level or logical level, so the intelligent network card can always fetch data transmitted in the network preferentially. Therefore, with no storage access or a small amount of storage access is involved, the intelligent network card can process these data with a relatively higher processing efficiency and a relatively smaller delay, and a relatively larger throughput, so as to achieve a higher performance benefit with a lower cost. For example, in consensus algorithm, there is almost no need to access storage except in the cases of change of network status, addition and deletion of node, change of consensus configuration and the like. Therefore, the consensus operation can be completed by the intelligent network card and only need to inform the CPU of a consensus result. Therefore, the CPU is not required to directly participate in the consensus process, thereby significantly improving the consensus efficiency. Similarly, the same effect can be achieved in forwarding transactions by the intelligent network card and achieving block synchronization by the intelligent network card on a newly-added blockchain node and the like and will not be repeated herein. Furthermore, after receiving transactions, the intelligent network card can identify or filter out a replay transaction by comparing the received transaction with historical transactions, for example, comparing data fields of sender information of transaction, destination address, time stamp, and hash value and the like. The intelligent network card can also perform content analysis for those received transactions, so as to filter out illegal transactions or predefined undesired transactions and the like as a supplementation to layer-2 or layer-3 packet filtering implemented by a switch.

For another example, a cryptographic acceleration card which is also called a high-speed cryptographic acceleration card can be deployed on the blockchain integrated station. The cryptographic acceleration card can realize total encrypted memory, defend against side-channel attacks by hardware reinforcement, and also realize physical protection against approaches such as probe, laser and the like, having very high security. For example, the cryptographic acceleration card used on the blockchain integrated station can have level-2 qualification from the State Cryptography Administration, level-3 qualification from the State Cryptography Administration and the like. When the cryptographic acceleration card is deployed, the hardware roof-of-trust key as described above can be maintained in the cryptographic acceleration card, and the cryptographic acceleration card can perform signature operation based on the hardware roof-of-trust key and replace or assist the smart contract processing chip to complete the operations such as the key negotiation as described above. Similarly, the cryptographic acceleration card can be used to maintain a public key so that the cryptographic acceleration card can realize signature verification operation based on the maintained public key. In short, at least part of operations relating to key management, encryption and decryption, and signature verification and the like on the blockchain integrated station can be handed over to the cryptographic acceleration card, so that very high security can be realized and task offloading can be realized for the CPU of the blockchain integrated station or the smart contract processing chip, thereby improving the processing efficiency.

Software optimization can be realized for the blockchain integrated station. For example, a certificate authority service can be built in the blockchain integrated station to realize automatic certificate issuing, node identity authentication, automatic blockchain construction, and automatic adding of blockchain node, thereby realizing the plug and play of the blockchain integrated station. In this case, a user can realize fast deployment of the blockchain integrated station. In addition to quickly establishing a private blockchain network among a plurality of blockchain integrated stations, the blockchain integrated station can integrate a standardized on-cloud service interface to enable the blockchain integrated station to automatically connect to on-cloud service, thereby realizing hybrid deployment between the blockchain integrated station and the cloud-deployed blockchain node to construct a hybrid blockchain network. The blockchain integrated station can also integrate a standardized cross-chain service interface to enable the blockchain integrated station to realize cross-chain services based on a standardized cross-chain protocol or standardized cross-chain service, thereby greatly expanding the application scenarios of the blockchain integrated station, and satisfying the cross-chain needs of users. For example, cross-chain data interaction between different blockchain networks is achieved, and for another example, cross-chain data interaction between the blockchain network and an off-chain computing node and the like is achieved (for example, the off-chain computing node shares computation task for the blockchain node and the like).

Based on a unified software logic, the blockchain integrated station in the present disclosure can realize a trusted startup process for a disk image deployed in itself. In this process, the blockchain integrated station first determines whether the disk image satisfies a startup condition that a current signature of the disk image is successfully verified by a pre-stored provider public key after receiving a startup instruction, and then executes the disk image in a case of satisfying the startup condition, thereby realizing trusted startup of the disk image in the blockchain integrated station. The process will be described below in combination with accompanying drawings.

FIG. 1 is a flowchart of a trusted startup method of a blockchain integrated station according to example embodiments of the present disclosure. The method is applied to a blockchain integrated station. In order to distinguish from a cryptographic acceleration card assembled in the blockchain integrated station, the executing subject of the method, i.e. the blockchain integrated station can be understood as a CPU of the blockchain integrated station, or another component other than the cryptographic acceleration card assembled in the blockchain integrated station. As shown in FIG. 1, the method can include the following steps:

At step 102, the blockchain integrated station initiates a signature verification request for a disk image deployed in the blockchain integrated station to a cryptographic acceleration card assembled on the blockchain integrated station in response to receiving a startup instruction, wherein a provider public key of a provider of the disk image is pre-stored in the cryptographic acceleration card.

In an embodiment, the startup instruction can be in several forms which are not limited herein. For example, the startup instruction can be a machine startup instruction sent when a user (for example, a user of the blockchain integrated station) performs a machine startup operation for the blockchain integrated station; or an image execution instruction sent by a management device for the binary disk image in the blockchain integrated station under the startup state of the blockchain integrated station or the like.

In this embodiment, a disk image (that has not been executed yet) is locally pre-deployed in the blockchain integrated station. The specific form of the disk image is not limited herein in the present disclosure. For example, the disk image can be an executable disk image, for example, an executable file of .exe format. At this time, the executable file can be pre-installed in an execution component of the blockchain integrated station, such as a hard disk drive. The disk image can also be a binary disk image, for example, a binary image of .bin format. At this time, the binary image can be pre-stored at a proper position of an execution component of the blockchain integrated station, such as a hard disk drive to be invoked and executed. Further, the disk image can be a binary disk image corresponding to a blockchain node and deployed in the blockchain integrated station. Correspondingly, when the binary disk image is executed, the blockchain integrated station is implemented as a blockchain node to, for example, realize one or more functions of blockchain visualization, contract creation and deployment, contract execution, key management and privacy computing and the like. The disk image can also be a platform disk image including the binary disk image corresponding to the blockchain node and deployed in the blockchain integrated station. When the platform disk image is executed, the blockchain integrated station is implemented as a blockchain node, and also configured to realize one or more other functions such as image processing, node monitoring and service monitoring, which will not be redundantly described herein.

In an embodiment, the current signature is generated by the provider of the disk image (referred to as provider for short) signing the disk image using the provider private key, where the provider private key and the provider public key are a pair of asymmetric keys. For example, before providing the disk image, the provider of the disk image can compute an image digest of the disk image in a Trusted Execution Environment (TEE), and then encrypt the image digest using its own provider private key to obtain a signature corresponding to the disk image. The TEE in which the provider signs the disk image can be constructed by adopting any technique of related technologies and any encryption algorithm of related technologies can be adopted for signature, which is not limited herein. It should be noted that in a case of taking a hash value of the disk image as a digest (hereinafter referred to as signature digest) in the signature process, a hash algorithm adopted by the blockchain integrated station or the cryptographic acceleration card to compute a current hash value of the disk image after receiving a startup request should be identical to a hash algorithm adopted by the provider to compute a hash value for signing the disk image. In this way, it is ensured that a definite verification result will be obtained when verification is performed for the signature of the disk image.

Further, after receiving the disk image and the signature of the disk image from the provider, the blockchain integrated station can first verify the received signature in order to ensure the authenticity of the deployed disk image. For example, the blockchain integrated station can decrypt the signature in the local TEE by using the pre-obtained provider public key to obtain the signature digest of the disk image, and then re-compute the image digest of the received disk image using the same digest computation algorithm, and then determine whether the image digest and the signature digest obtained by decryption are the same. When the image digest and the signature digest obtained by decryption are the same, the blockchain integrated station determines that the received disk image is a trusted disk image (not tampered) provided by the provider, and further deploys the disk image in a local execution component and stores the received signature and the disk image in a local storage space in an associated manner. In a case of a plurality of disk images, the blockchain integrated station can establish an association between each disk image and a corresponding signature, and store the signatures and the disk images based on the association. Thus, the signature corresponding to the disk image can be specifically determined.

In an embodiment, after receiving the startup instruction, the blockchain integrated station can determine a disk image corresponding to the startup instruction according to information such as the predetermined corresponding relationship or a file identifier included in the startup instruction, and then determine a current signature of the disk image and send a signature verification request including the current signature to the cryptographic acceleration card, or send a signature verification request in association with the current signature to the cryptographic acceleration card. Alternatively, the current signature and the disk image can also be associated and sent to the blockchain integrated station by the provider and then locally stored by the blockchain integrated station in an associated manner.

In an embodiment, in a case that the provider takes the hash value of the disk image as a digest for signing the disk image, the blockchain integrated station can also use the same hash algorithm as the provider to compute the current hash value of the disk image in the TEE locally deployed after receiving the startup request, and send a signature verification request including the current hash value to the cryptographic acceleration card or send a signature verification request in association with the current hash value to the cryptographic acceleration card, so that the cryptographic acceleration card can directly use the current hash value to verify the current signature, thereby avoiding the possible decreased efficiency caused by computation of the cryptographic acceleration card for the hash value.

At step 104, the blockchain integrated station receives a signature verification result returned by the cryptographic acceleration card, where the signature verification result is obtained by the cryptographic acceleration card verifying the current signature of the disk image using the provider public key.

In an embodiment, after receiving a signature verification request including the current signature, the cryptographic acceleration card can extract the current signature from the signature verification request; or the cryptographic acceleration card can directly determine the current signature after receiving a signature verification request in association with the current signature. Further, a corresponding disk image can be determined according to the signature verification request or the current signature, for example, a corresponding disk image can be determined according to a file identifier of disk image included in the signature verification request. At this time, the cryptographic acceleration card can request an image digest of the disk image from the blockchain integrated station or compute the image digest of the disk image in the TEE, so as to use the image digest to verify the signature of the disk image.

In another embodiment, after receiving a signature verification request including the current signature and the image digest, the cryptographic acceleration card can extract the current signature and the image digest from the signature verification request; or, the cryptographic acceleration card can directly determine the current signature and the image digest after receiving a signature verification request in association with the current signature and the image digest, so as to use the image digest to verify the current signature.

In the above-mentioned two embodiments, the image digest can be an image hash value of the disk image. A hash algorithm adopted by the blockchain integrated station or the cryptographic acceleration card to compute the image hash value should be identical to a hash algorithm adopted by the provider to sign the disk image.

In an embodiment, the cryptographic acceleration card can verify the current signature in the following manner: firstly, a signature digest is obtained by decrypting the current signature using the locally pre-stored provider public key of the provider and then a corresponding image digest is determined according to the signature verification request (as in the above-mentioned two embodiments); then, whether the signature digest and the image digest are the same is determined by comparing the signature digest and the image digest, in a case that the signature digest and the image digest are the same, it is determined that the current signature passes verification; or, in a case that the signature digest and the image digest are not the same, it is determined the current signature does not pass verification; finally, a corresponding signature verification result is generated according to the comparison result.

At step 106, in a case that the signature verification result indicates the current signature passes verification, the blockchain integrated station executes the disk image deployed in the blockchain integrated station to form a blockchain node.

In this embodiment, if the signature verification result indicates the current signature passes verification, it indicates that the disk image locally deployed in the blockchain integrated station is a disk image provided by the provider, i.e. a disk image that is not tempered and is successfully deployed, and therefore the disk image is trustable. As a result, the blockchain integrated station can execute the disk image to form a blockchain node. Conversely, if the signature verification result indicates the current signature does not pass verification, it indicates that the disk image locally deployed in the blockchain integrated station is not a standard disk image provided by the provider but a disk image that may be illegally tampered or erroneously deployed, and therefore the disk image is un-trustable. At this time, the blockchain integrated station can refuse to execute the disk image.

In an embodiment, in a case that the signature verification result indicates that the current signature does not pass verification, the disk image locally deployed in the blockchain integrated station is not a standard disk image provided by the provider. As a result, the blockchain integrated station can terminate the startup process of the blockchain integrated station, thereby avoiding executing a disk image different from the standard disk image. In another embodiment, the blockchain integrated station can also send a warning message for the disk image to at least one of a management personnel, a management device of the blockchain integrated station (for example, a control host for controlling a plurality of blockchain integrated stations at the same time), and a security service relating to the blockchain integrated station and the like, so that the management personnel, the management device or the security service performs corresponding processing for the disk image. Furthermore, the blockchain integrated station can also perform illegality detection for the disk image with a detection result included in the warning message, so that specific processing can be performed for the disk image. The response processing can include at least one of recording warning message, recording detection result of disk image and deleting disk image and the like.

In an embodiment, further continued from the embodiment in which the current signature is generated by the provider signing the disk image using the provider private key, in a case that the signature verification result indicates that the current signature does not pass verification, the blockchain integrated station can request a disk image from the provider again, and replace the currently-deployed disk image with the obtained disk image, thus ensuring the disk image deployed in the blockchain integrated station is consistent with the disk image provided by the provider. Furthermore, when requesting a disk image from the provider, the blockchain integrated station can also request a current signature performed for the disk image by the provider using its provider private key at the same time, thus ensuring the current signature corresponds to the disk image provided by the provider.

In an embodiment, because the deployed disk image corresponding to the current signature is a trusted disk image in a case that the signature verification result indicates that the current signature passes verification, the blockchain integrated station can write the disk image corresponding to the current signature (i.e. the trusted disk image) into the TEE locally deployed in the blockchain integrated station as a backup disk image the first time it received a signature verification result indicating the current signature passes verification. Afterwards, in a case that the signature verification result indicates that the current signature does not pass verification, the blockchain integrated station can read the backup disk image from the TEE, and then replace the disk image with the backup disk image and respond to the startup instruction again. A standard disk image is obtained and backed up in the TEE, so that the currently-deployed disk image is replaced with the disk image provided by the provider in a case that the current disk image is different from the standard disk image. In this way, it is guaranteed that the disk image locally deployed in the blockchain integrated station is consistent with the disk image provided by the provider. Further, and by using pre-stored and trusted standard disk file to replace deployed (but not trusted) disk file avoids possible increase of network load caused by requesting a standard disk image again from the provider every time that the signature verification result indicates that the current signature does not pass verification.

Figure 2:
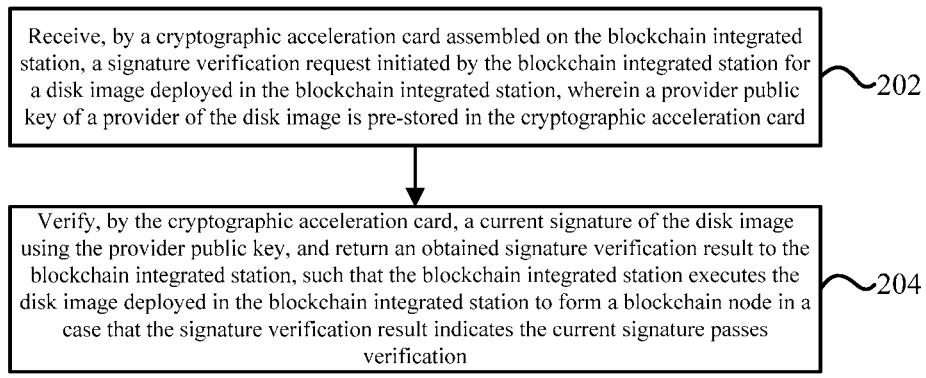
FIG. 2 is a flowchart of another trusted startup method of a blockchain integrated station according to example embodiments of the present disclosure.

Correspondingly, FIG. 2 is a flowchart of another trusted startup method of a blockchain integrated station according to example embodiments of the present disclosure. The method is applied to a cryptographic acceleration card. As shown in FIG. 2, the method can include the following steps.

At step 202, a cryptographic acceleration card assembled on the blockchain integrated station receives a signature verification request initiated by the blockchain integrated station for a disk image deployed in the blockchain integrated station, where a provider public key of a provider of the disk image is pre-stored in the cryptographic acceleration card.

In this embodiment, a disk image (that has not been executed yet) is locally pre-deployed in the blockchain integrated station. The specific form of the disk image is not limited herein in the present disclosure. For example, the disk image can be an executable disk image, for example, an executable file of .exe format. At this time, the executable file can be pre-installed in an execution component of the blockchain integrated station, such as a hard disk drive. The disk image can also be a binary disk image, for example, a binary image of .bin format. At this time, the binary image can be pre-stored at a proper position of an execution component of the blockchain integrated station, such as a hard disk drive to be invoked and executed. Further, the disk image can be a binary disk image corresponding to a blockchain node and deployed in the blockchain integrated station. Correspondingly, when the binary disk image is executed, the blockchain integrated station is implemented as a blockchain node, for example, to realize one or more functions of blockchain visualization, contract creation and deployment, contract execution, key management and privacy computing and the like. The disk image can also be a platform disk image including the binary disk image corresponding to the blockchain node and deployed in the blockchain integrated station. When the platform disk image is executed, the blockchain integrated station is not only implemented as a blockchain node, but also can realize one or more functions such as image processing, node monitoring and service monitoring, which will not be redundantly described herein.

In an embodiment, the startup instruction can be in several forms which are not limited herein. For example, the startup instruction can be a machine startup instruction sent when a user (for example, a user of the blockchain integrated station) performs a machine startup operation for the blockchain integrated station; or an image execution instruction sent by a management device for the binary disk image in the blockchain integrated station under the startup state of the blockchain integrated station or the like.

In an embodiment, the current signature is generated by the provider of the disk image signing the disk image using the provider private key, where the provider private key and the provider public key are a pair of asymmetric keys. For example, before providing the disk image, the provider of the disk image can compute an image digest of the disk image in a Trusted Execution Environment (TEE), and then encrypt the image digest using its own provider private key to obtain a signature corresponding to the disk image. The TEE in which the provider signs the disk image can be constructed by adopting any technique of related technologies and any encryption algorithm of related technologies can be adopted for signature, which is not limited herein. It should be noted that in a case of taking a hash value of the disk image as a signature digest in the signature process, a hash algorithm adopted by the blockchain integrated station or the cryptographic acceleration card to compute a current hash value of the disk image after receiving a startup request should be identical to a hash algorithm adopted by the provider to compute a hash value for signing the disk image. In this way, it is ensured that a definite verification result will be obtained when verification is performed for the signature of the disk image.

At step 204, the cryptographic acceleration card verifies a current signature of the disk image using the provider public key and returns an obtained signature verification result to the blockchain integrated station, such that the blockchain integrated station executes the disk image deployed in the blockchain integrated station to form a blockchain node in a case that the signature verification result indicates the current signature passes verification.

Reference can be made to various embodiments corresponding to FIG. 1 for the specific process in which the cryptographic acceleration card realizes the trusted startup of the blockchain integrated station through cooperation with the blockchain integrated station, and thus redundant descriptions will not be made herein.

In the above-mentioned embodiments of the present disclosure, after the blockchain integrated station receives the startup instruction, the cryptographic acceleration card verifies the current signature of the currently-deployed disk image in the blockchain integrated station using the pre-stored provider public key of the provider of the disk image (for example, whether the signature digest included in the current signature and the image digest of the disk image are the same is determined by comparing the signature digest included in the current signature and the image digest of the disk image), such that the blockchain integrated station determines whether the current signature passes verification and executes the disk image in a case of further determining the currently-deployed disk image is indeed a disk image provided by the provider, thereby realizing the startup of the blockchain integrated station. By signature verification, it is guaranteed that the executed disk image is the same as the disk image provided by the provider. Thus, the trusted execution of the disk image is ensured, thus ensuring the trusted startup of the blockchain integrated station.

Figure 3:
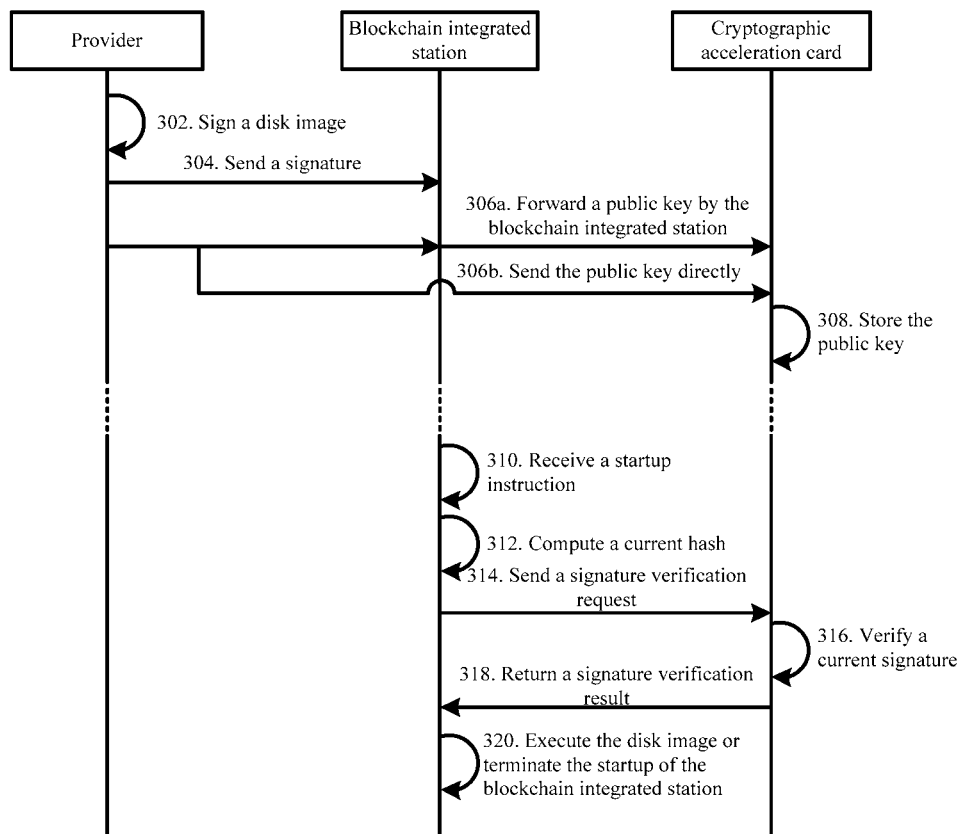
FIG. 3 is an interaction flowchart of a trusted startup method of a blockchain integrated station according to example embodiments of the present disclosure.

In combination with the interaction flowchart of the trusted startup method of the blockchain integrated station shown in FIG. 3, a process in which a trusted startup of a blockchain integrated station is realized through cooperation among a provider of disk image, a blockchain integrated station and a cryptographic acceleration card will be described below. As shown in FIG. 3, the process can include the following steps.

At step 302, a provider of a disk image signs the disk image provided by the provider.

At step 304, the provider sends the signature to a blockchain integrated station.

In an embodiment, the disk image provided by the provider can be an executable disk image, for example, an executable file of .exe format, or a binary disk image, for example, an executable file of .bin format. Furthermore, when the disk image is a binary disk image, the disk image can a binary disk image corresponding to a blockchain node and deployed in the blockchain integrated station, and the blockchain integrated station executing the binary disk image can be implemented as a blockchain node; or, the disk image can also be a platform disk image including the binary disk image in the blockchain integrated station, and the blockchain integrated station executing the platform disk image can not only be implemented as a blockchain node but also configured to realize other functions as above, which will not be repeated herein.

In an embodiment, for a standard disk image provided (or not provided yet) by the provider, the provider can compute a corresponding standard hash value in the TEE. The TEE can be constructed based on Intel Software Guard Extensions (SGX) or AMD TrustZone technique. The TEE can be locally deployed in the provider such that the provider can directly compute the standard hash value in the TEE; or, the TEE can be deployed in another component relating to the provider such that the provider can control the standard hash value to be encrypted and transmitted to the cryptographic acceleration card after computing the standard hash value in the TEE. In addition, when the image digest is a hash value of the disk image, the provider can compute the hash value by adopting a hash algorithm such as SHA algorithm, MD4 algorithm, MD5 algorithm, ETHASH algorithm, and SCRYPT algorithm. Reference can be made to the contents of related technologies for the specific process of the TEE construction and the specific process of the hash value computation, and redundant descriptions will not be made herein.

After obtaining the standard hash value, the provider can sign the disk image based on the standard hash value. For example, the standard hash value can be encrypted and the encrypted standard hash value is the signature. Of course, signature can also be performed in another manner and will not be limited herein.

In this embodiment, the provider can send the signature to the cryptographic acceleration card. Because the cryptographic acceleration card is assembled on the blockchain integrated station, the provider can forward the signature to the cryptographic acceleration card through blockchain integrated station (corresponding to the step 306a), or send the signature directly to the cryptographic acceleration card (corresponding to step 306b).

At step 306a, the provider public key is forwarded by the blockchain integrated station to the cryptographic acceleration card.

The provider can send the signature performed for the disk image in the TEE (encrypted signature digest) to the blockchain integrated station which forwards the signature to the cryptographic acceleration card.

At step 306b, the provider sends the provider public key directly to the cryptographic acceleration card.

The provider can send the signature performed for the disk image in the TEE directly to the cryptographic acceleration card.

At step 308, the cryptographic acceleration card stores the provider public key locally.

In an embodiment, after receiving the provider public key forwarded by the blockchain integrated station or directly sent by the provider, the cryptographic acceleration card can store the provider public key in a corresponding secure key zone in the TEE, such that the provider public key is directly invoked, thereby speeding up subsequent hash values comparison.

In this embodiment, as an example embodiment, the provider can first send the signature corresponding to the disk image to the blockchain integrated station and then send the provider public key to the cryptographic acceleration card; or, as another example embodiment, the provider can first send the provider public key to the cryptographic acceleration card and then send the signature corresponding to the disk image to the blockchain integrated station. In other words, there is no necessary precedence between steps 302-304 "the signature corresponding to the disk image is sent to the blockchain integrated station" and steps 306a-308 "the provider public key is sent to the cryptographic acceleration card", and thus adjustment can be made according to actual situations.

Thus, pre-storage of the provider public key and the signature corresponding to the disk image is completed. The blockchain integrated station can receive a startup instruction at any moment after step 308, that is, no limitation is made to a time interval between the step 308 and the step 310.

At step 310, the blockchain integrated station receives a startup instruction.

In an embodiment, the startup instruction can be in several forms which are not limited in the present disclosure. For example, the startup instruction can be a machine startup instruction sent when a user (for example, a user of the blockchain integrated station) performs a machine startup operation for the blockchain integrated station; or an image execution instruction sent by a management device for the binary disk image in the blockchain integrated station under the startup state of the blockchain integrated station or the like.

After receiving the startup instruction, the blockchain integrated station can determine a locally deployed disk image corresponding to the startup instruction according to a predetermined rule or a file identifier included in the startup instruction. For example, in a case that the startup instruction is a machine startup instruction, a platform disk image deployed in the blockchain integrated station is determined as a to-be-executed disk image; in a case that the startup instruction includes a file identifier, a disk image corresponding to the file identifier is determined as a to-be-executed disk image.

At step 312, the blockchain integrated station computes a current hash of the disk image.

At step 314, the blockchain integrated station sends a signature verification request to the cryptographic acceleration card.

In an embodiment, after determining the disk image corresponding to the startup instruction and deployed in the blockchain integrated station (the to-be-executed disk image), the blockchain integrated station can further determine a current signature of the disk image, and send a signature verification request including the current signature to the cryptographic acceleration card, or send a signature verification request in association with the current signature to the cryptographic acceleration card. The current signature can be sent in advance by the provider to the blockchain integrated station which stores the current signature and the disk image locally in an associated manner.

Correspondingly, after receiving the signature verification request including the current signature, the cryptographic acceleration card can extract the current signature from the signature verification request; or, the cryptographic acceleration card can directly determine the current signature after receiving a signature verification request in association with the current signature. Further, a corresponding disk image can be determined according to the signature verification request or the current signature, for example, a corresponding disk image can be determined according to a file identifier of disk image included in the signature verification request. At this time, the cryptographic acceleration card can request an image hash value of the disk image from the blockchain integrated station or compute the image hash value of the disk image in the TEE corresponding to the cryptographic acceleration card, so as to use the image hash value to verify the signature of the disk image.

In an embodiment, before sending a signature verification request to the cryptographic acceleration card, the blockchain integrated station can compute the current hash value of the determined disk image. A hash algorithm adopted to compute the current hash value should be identical to a hash algorithm adopted by the provider to compute a signature hash value for signing the disk image to ensure that a definite verification result will be present between the current hash value and the signature hash value (hash values comparison will be meaningless if hash algorithms are inconsistent).

Further, the blockchain integrated station can also send a signature verification request including the current signature and the image hash value to the cryptographic acceleration card, or send a signature verification request in association with the current signature and the image hash value to the cryptographic acceleration card, so that the cryptographic acceleration card can directly use the image hash value to verify the current signature, thereby avoiding possible decreased efficiency caused by computation of the cryptographic acceleration card for the hash value.

Correspondingly, after receiving a signature verification request including the current signature and the image hash value, the cryptographic acceleration card can extract the current signature and the image hash value from the signature verification request; or, the cryptographic acceleration card can directly determine the current signature and the image hash value after receiving a signature verification request in association with the current signature and the image hash value, so as to use the image hash value to verify the current signature.

At step 316, the cryptographic acceleration card verifies the current signature.

At step 318, the cryptographic acceleration card returns a signature verification result to the blockchain integrated station.

In an embodiment, the cryptographic acceleration card can obtain a signature hash value by decrypting the signature using the pre-obtained provider public key in the TEE, and then compare the signature hash value of plaintext and the image hash value in the TEE. The comparison can be performed in a full text bit-by-bit comparison manner, that is, the bits of the current hash value and the standard hash value are compared bit by bit along a predetermined direction: if the values of all bits of the signature hash value are equal to the values of all bits of the image hash value, it is determined that the signature hash value and the image hash value are the same; on the contrary, if the value of any bit of the signature hash value is unequal to the value of the corresponding bit of the image hash value, it is determined that the signature hash value and the image hash value are not the same. After the comparison is completed, the cryptographic acceleration card can return the corresponding comparison result to the blockchain integrated station.

At step 320, the blockchain integrated station determines to execute the disk image or terminate the startup of the blockchain integrated station according to the signature verification result.

The image hash value is computed based on the disk image locally deployed in the blockchain integrated station, and the signature hash value is computed based on the signature corresponding to the standard disk image provided by the provider. Therefore, if the signature verification result indicates that the current signature passes verification, it indicates that the locally deployed disk image is a standard disk image provided by the provider and thus the disk image is trustable (the disk image is not tampered during transmission and deployment processes); if the signature verification result indicates that the current signature does not pass verification, it indicates that the locally deployed disk image is not a standard disk image provided by the provider and thus the disk image is un-trustable (the disk image can be illegally tampered during transmission and deployment processes). The blockchain integrated station can perform subsequent processing respectively according to the comparison result.

In an embodiment, in a case that the signature verification result indicates that the current signature passes verification, the blockchain integrated station can execute the locally deployed disk image, so as to realize startup of the blockchain integrated station. At this time, the locally-deployed disk image is a trusted standard disk image. Therefore, the disk image can be directly executed to realize the startup of the blockchain integrated station. Continued from the previously mentioned embodiment, in a case that the disk image is a binary disk image corresponding to a blockchain node and deployed in the blockchain integrated station, the blockchain integrated station can be implemented as a blockchain node to, for example, realize blockchain visualization, contract creation, deployment and execution, key management and/or privacy computing and so on when the binary disk image is executed; in a case that the disk image is a platform disk image including the binary disk image in the blockchain integrated station, when the platform disk image is executed, the blockchain integrated station is not only implemented as a blockchain node but also configured to realize other functions such as image processing, node monitoring and/or service monitoring other than blockchain function, which will not be repeated herein.

In an embodiment, continued from the embodiment in which the signature is obtained by the provider signing the disk image provided by it in the TEE, in a case that the signature verification result indicates that the current signature does not pass verification, the blockchain integrated station can request a standard disk image again from the provider, and replace the current disk image with the obtained standard disk image to ensure the disk image deployed in the blockchain integrated station is consistent with the standard disk image. Furthermore, the blockchain integrated station can request the current signature of the standard disk image at the same time when requesting the standard disk image, or request the current signature of the standard disk image from the provider after the standard disk image obtained from the provider passes trusted verification, so as to ensure the current signature corresponds to the standard disk image.

In an embodiment, the blockchain integrated station can pre-store a disk image as a backup disk image in the TEE locally deployed. As a result, in a case that the signature verification result indicates that the current signature does not pass verification, the blockchain integrated station can read the backup disk image from the TEE, and then replace the locally-deployed disk image with the backup disk image, and respond to the startup instruction again. In this way, it is guaranteed that the disk image locally deployed in the blockchain integrated station is consistent with the disk image provided by the provider, so that the trusted startup of the blockchain integrated station can be realized as possible even in a case that the locally-deployed disk image is un-trustable.

Further, the blockchain integrated station can write the disk image corresponding to the current hash value (i.e. the locally-deployed trusted disk image) into the TEE locally deployed in the blockchain integrated station as a backup disk image the first time it received the signature verification result indicating the current signature passes verification. Alternatively, the blockchain integrated station can also actively request the disk image corresponding to the signature from the provider before receiving the startup instruction. Alternatively, corresponding to the previously mentioned embodiment in which the provider public key is forwarded by the blockchain integrated station, the provider can also send the disk image in association with the public key to the blockchain integrated station so that the blockchain integrated station writes the disk image into the locally-deployed TEE as a backup disk image.

In an embodiment, in a case that the signature verification result indicates the current signature does not pass verification, the disk image locally deployed in the blockchain integrated station is not a standard disk image provided by the provider. Therefore, the blockchain integrated station can terminate the startup process of the blockchain integrated station, thus avoiding executing a disk image different from the standard disk image.

In another embodiment, in a case that the signature verification result indicates that the current signature does not pass verification, the blockchain integrated station can also send a warning for the currently-deployed disk image. For example, warnings, in the form of sound, light or visual popup window can be sent to a user so that the user can know the disk image is not a standard disk image. Further, an illegality detection can be performed for the disk image with a detection result displayed to the user, so that the user can know more detailed illegal information of the disk image and further perform specific corresponding processing. A warning message can also be sent to a management device of the blockchain integrated station (for example, a control host controlling a plurality of blockchain integrated stations) or a security service relating to the blockchain integrated station so that the management device or the security service can perform corresponding processing for the disk image. Similarly, an illegality detection can also be performed for the disk image with a detection result included in the warning message, so that the corresponding processing can be performed specifically. The response processing can include at least one of recording warning message, recording detection result of disk image, and deleting disk image and the like.

Figure 4:
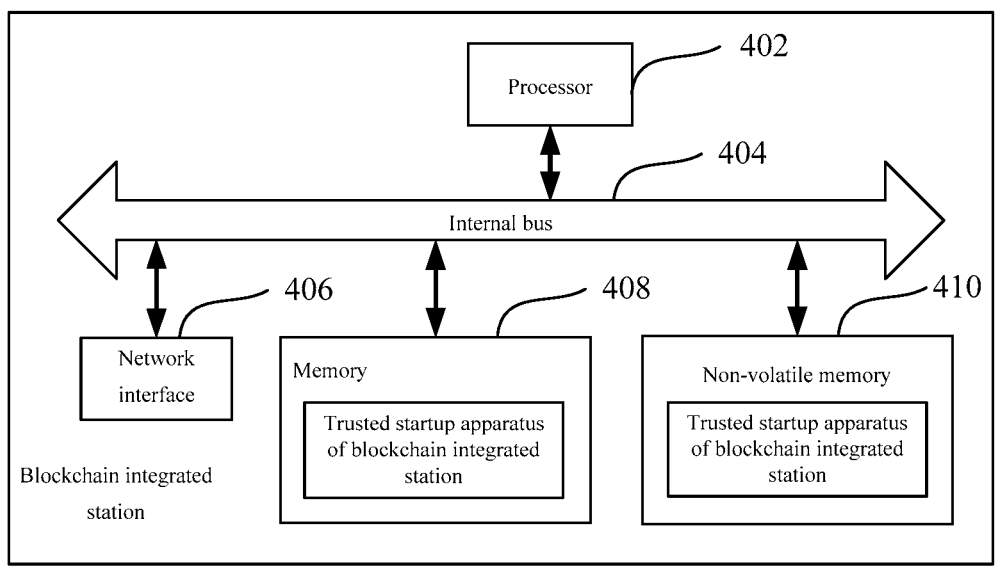
FIG. 4 is a structural schematic diagram of a blockchain integrated station according to example embodiments of the present disclosure.

FIG. 4 is a structural schematic diagram of a blockchain integrated station according to example embodiments of the present disclosure. As shown in FIG. 4, from the hardware level, the device includes a processor 402, an internal bus 404, a network interface 406, a memory 408, and a non-volatile memory 410. Of course, the device can further include hardware required for other services. The processor 402 reads corresponding computer programs from the non-volatile memory 410 to the memory 408 for running, so as to logically form a trusted startup apparatus of a blockchain integrated station. Of course, in addition to the software implementation, one or more embodiments of the present disclosure do not preclude other implementations, for example, logic device or a combination of software and hardware or the like. That is, the executing subject of the following processing is not limited to each logic unit and can also be hardware or logic device.

Figure 5:
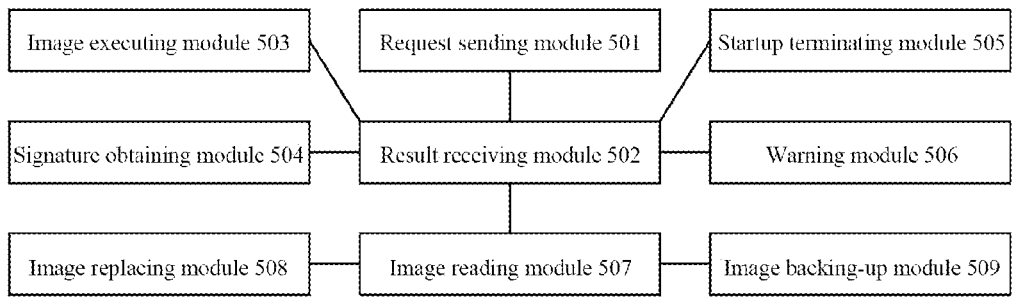
FIG. 5 is a block diagram of a trusted startup apparatus of a blockchain integrated station according to example embodiments of the present disclosure.

As shown in FIG. 5, in a software implementation, a trusted startup apparatus of a blockchain integrated station can include:

a request sending module 501, configured to enable the blockchain integrated station to initiate a signature verification request for a disk image deployed in the blockchain integrated station to a cryptographic acceleration card assembled on the blockchain integrated station in response to receiving a startup instruction, wherein a provider public key of a provider of the disk image is pre-stored in the cryptographic acceleration card;

a result receiving module 502, configured to enable the blockchain integrated station to receive a signature verification result returned by the cryptographic acceleration card, wherein the signature verification result is obtained by the cryptographic acceleration card verifying a current signature of the disk image using the provider public key;

an image executing module 503, configured to enable the blockchain integrated station to execute the disk image deployed in the blockchain integrated station to form a blockchain node in a case that the signature verification result indicates the current signature passes verification.

Optionally, the disk image deployed in the blockchain integrated station includes:

a binary disk image corresponding to a blockchain node and deployed in the blockchain integrated station; or a platform disk image deployed in the blockchain integrated station, where the platform disk image includes the binary disk image.

Optionally, the current signature is generated by the provider of the disk image signing the disk image using a provider private key, where the provider private key and the provider public key form a pair of asymmetric keys.

Optionally, the apparatus further includes:

a signature obtaining module 504, configured to enable the blockchain integrated station to request again a disk image and a current signature corresponding to the disk image from the provider in a case that the signature verification result indicates the current signature does not pass verification.

Optionally, the apparatus further includes:

a startup terminating module 505, configured to the blockchain integrated station to terminate a startup process of the blockchain integrated station in a case that the signature verification result indicates the current signature does not pass verification; and/or, a warning module 506, configured to enable the blockchain integrated station to send a warning for the disk image in a case that the signature verification result indicates the current signature does not pass verification.

Optionally, the apparatus further includes:

an image reading module 507, configured to enable the blockchain integrated station to read a backup disk image from a locally-deployed trusted execution environment in a case that the signature verification result indicates the current signature does not pass verification;

an image replacing module 508, configured to enable the blockchain integrated station to replace the disk image with the backup disk image and respond to the startup instruction again.

Optionally, the apparatus further includes:

an image backing-up module 509, configured to enable the blockchain integrated station to write the disk image corresponding to the current signature into the trusted execution environment locally deployed by the blockchain integrated station as the backup disk image the first time it received a signature verification result indicating the current signature passes verification.

Figure 6:
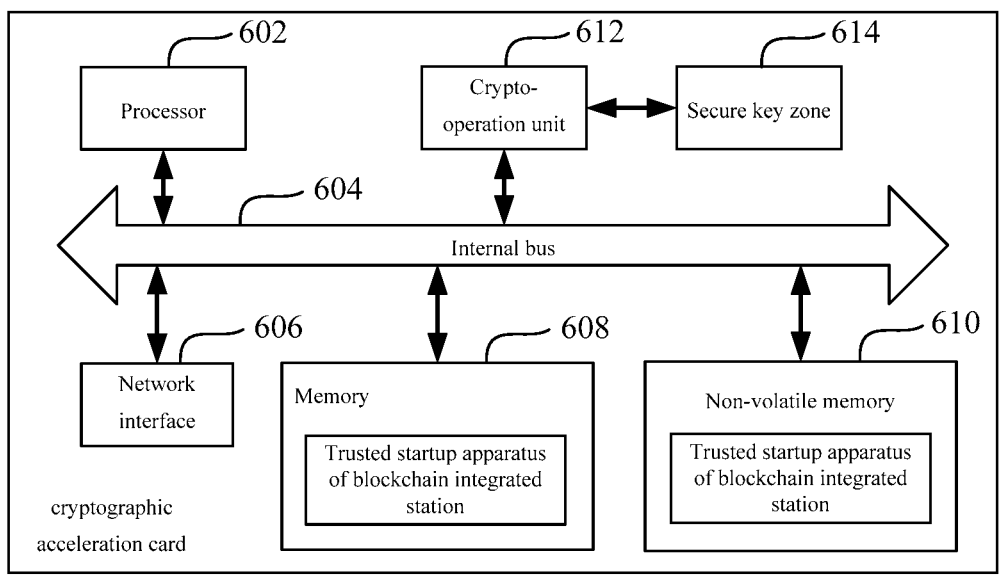
FIG. 6 is a structural schematic diagram of a cryptographic acceleration card according to example embodiments of the present disclosure.

FIG. 6 is a structural schematic diagram of a cryptographic acceleration card according to example embodiments of the present disclosure. As shown in FIG. 6, from the hardware level, the device includes a processor 602, an internal bus 604, a network interface 606, a memory 608, a non-volatile memory 610, a crypto-operation unit 612 and a secure key zone 614. Of course, the device can further include hardware required for other services. The crypto-operation unit 612 stores received or generated relevant keys in the secure key zone 614 so that the processor 602 invoke the keys to realize relevant functions such as encryption, decryption, signature and/or signature verification. The processor 602 reads corresponding computer programs from the non-volatile memory 610 to the memory 608 for running, so as to logically form a trusted startup apparatus of a blockchain integrated station. Of course, in addition to the software implementation, one or more embodiments of the present disclosure do not preclude other implementations, for example, logic device or a combination of software and hardware or the like. That is, the executing subject of the following processing is not limited to each logic unit and can also be hardware or logic device.

Figure 7:
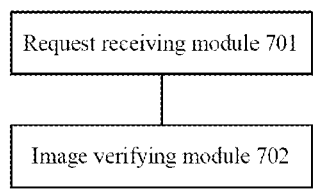
FIG. 7 is a block diagram of another trusted startup apparatus of a blockchain integrated station according to example embodiments of the present disclosure.

As shown in FIG. 7, in a software implementation, a trusted startup apparatus of a blockchain integrated station can include:

a request receiving module 701, configured to enable a cryptographic acceleration card assembled on the blockchain integrated station to receive a signature verification request initiated by the blockchain integrated station for a disk image deployed in the blockchain integrated station, wherein a provider public key of a provider of the disk image is pre-stored in the cryptographic acceleration card;

an image verifying module 702, configured to enable the cryptographic acceleration card to verify a current signature of the disk image using the provider public key, and return an obtained signature verification result to the blockchain integrated station, such that the blockchain integrated station executes the disk image deployed in the blockchain integrated station to form a blockchain node in a case that the signature verification result indicates the current signature passes verification.

Optionally, the disk image deployed in the blockchain integrated station includes:

a binary disk image corresponding to a blockchain node and deployed in the blockchain integrated station; or a platform disk image deployed in the blockchain integrated station, where the platform disk image includes the binary disk image.

Optionally, the current signature is generated by the provider of the disk image signing the disk image using a provider private key, where the provider private key and the provider public key form a pair of asymmetric keys.

The systems, apparatuses, modules or units described in the above-mentioned embodiments can be specifically implemented by a computer chip or an entity or can be implemented by a product with a particular function. A typical implementing device can be a computer and the computer can specifically be a personal computer, a laptop computer, a cellular phone, a camera phone, a smart phone, a personal digital assistant, a media player, a navigation device, an email transceiver, a game console, a tablet computer, a wearable device, or a combination of any several devices of the above-mentioned devices.

In a typical configuration, the computer can include one or more central processing units (CPU), one or more input/output interfaces, one or more network interfaces and one or more memories.

The memory can include a non-permanent memory, a random access memory (RAM), and/or a non-volatile memory and the like in a computer readable medium, for example, read only memory (ROM), or flash RAM. The memory is one example of the computer readable medium.

The computer readable medium includes permanent, non-permanent, mobile and non-mobile media, which can realize information storage by any method or technology. The information can be computer readable instructions, data structures, program modules and other data. The examples of the computer storage medium include but not limited to: a phase change random access memory (PRAM), a Static Random Access Memory (SRAM), a Dynamic Random Access Memory (DRAM), and other types of RAMs, Read-Only Memory (ROM), an Electrically-Erasable Programmable Read-Only Memory (EEPROM), a Flash Memory, or other memory technology, CD-ROM, digital versatile disc (DVD) or other optical storage, cassette type magnetic tape, magnetic disk storage, quantum memory, storage medium based on graphene, or other magnetic storage device or other non-transmission medium for storing information accessible by computing devices. According to the definition of the specification, the computer readable medium does not include transitory computer readable media, for example, modulated data signal and carriers.

It should be noted that the term "including", "containing" or any variation thereof is intended to encompass non-exclusive inclusion, so that a process, method, product or device including a series of elements includes not only those elements but also other elements not listed explicitly or those elements inherent to such a process, method, product or device. Without more limitations, an element defined by the statement "including a . . . " shall not be precluded to include additional same elements in a process, method, product or device including the elements.

The specific embodiments are described as above. Other embodiments are within the scope of the appended claims. In some cases, the actions or steps recorded in the claims can be performed in a sequence different from the embodiments to achieve the desired result. Further, the processes shown in drawings do not necessarily require a particular sequence or a continuous sequence shown to achieve the desired result. In some embodiments, a multi-task processing and parallel processing is possible and can also be advantageous.

The terms used in one or more embodiments of the present disclosure are for the purpose of describing particular embodiments only, and are not intended to limit the one or more embodiments of the present disclosure. Terms "a", "the" and "said" used in their singular forms in one or more embodiments of the present disclosure and the appended claims are also intended to include plurality, unless clearly indicated otherwise in the context. It should also be understood that the term "and/or" as used herein refers to and includes any and all possible combinations of one or more of the associated listed items.

It should be understood that, although the terms "first," "second," "third," and the like can be used in one or more embodiments of the present disclosure to describe various information, such information should not be limited to these terms. These terms are only used to distinguish one category of information from another. For example, without departing from the scope of one or more embodiments of the present disclosure, first information can be referred as second information; and similarly, the second information can also be referred as the first information. Depending on the context, the term "if" as used herein can be interpreted as "when" or "upon" or "in response to determining".

The above-mentioned disclosure is merely illustrative of preferred embodiments of one or more embodiments of the present disclosure but not intended to limit the present disclosure, and any modifications, equivalent substitutions, adaptations thereof made within the spirit and principles of the disclosure shall be encompassed in the scope of protection of the present disclosure.

What is claimed is:
1. A blockchain integrated station, comprising:
    a cryptographic acceleration card that stores a provider public key of a provider of a disk image, wherein the disk image comprises an executable file that enables the blockchain integrated station to be established as a blockchain node of a blockchain network to realize one or more functions of the blockchain node;
at least one processor; and
one or more memories coupled to the at least one processor and storing programming instructions for execution by the at least one processor to perform one or more operations comprising:
receiving, by the at least one processor of the blockchain integrated station, a startup instruction for the blockchain integrated station to establish the blockchain integrated station as the blockchain node of the blockchain network;
in response to receiving the startup instruction, sending, by the at least one processor of the blockchain integrated station, a signature verification request for the disk image stored in the blockchain integrated station to the cryptographic acceleration card;
receiving, by the at least one processor of the blockchain integrated station, a signature verification result from the cryptographic acceleration card, wherein the signature verification result indicates whether a signature of the disk image passes a verification;
in response to determining that the signature verification result indicates that the signature of the disk image passes the verification, establishing the blockchain integrated station as the blockchain node of the blockchain network based on executing, by the at least one processor of the blockchain integrated station, the disk image that comprises the executable file; and
after establishing the blockchain integrated station as the blockchain node of the blockchain network, performing, by the blockchain integrated station, the one or more functions of the blockchain node that comprise contract creation and deployment and contract execution.

2. The blockchain integrated station of claim 1, wherein the disk image comprises at least one of:
a binary disk image, wherein when the binary disk image is executed, the one or more functions of the blockchain node are added to the blockchain integrated station; or
a platform disk image comprising the binary disk image, wherein when the platform disk image is executed, the one or more functions of the blockchain node and one or more additional functions different than the one or more functions of the blockchain node are added to the blockchain integrated station.

3. The blockchain integrated station of claim 1, wherein the signature verification result is determined using the provider public key.

4. The blockchain integrated station of claim 3, wherein the signature is generated by the provider of the disk image by signing the disk image using a provider private key, and wherein the provider private key and the provider public key are a pair of asymmetric keys.

5. The blockchain integrated station of claim 1, wherein in response to determining that the signature verification result indicates that the signature of the disk image does not pass the verification, the operations further comprise at least one of:
requesting, by the blockchain integrated station, an additional disk image and an additional signature of the additional disk image from the provider of the disk image;
terminating, by the blockchain integrated station, a startup process of the blockchain integrated station; or sending, by the blockchain integrated station, a warning of the disk image.

6. The blockchain integrated station of claim 1, the operations comprising:
in response to determining that the signature verification result indicates that the signature of the disk image does not pass the verification, reading, by the blockchain integrated station, a backup disk image from a trusted execution environment of the blockchain integrated station;
replacing, by the blockchain integrated station, the disk image with the backup disk image; and
responding to the startup instruction again.

7. The blockchain integrated station of claim 6, the operations comprising:
in response to receiving an additional signature verification result indicating that an additional signature of an additional disk image passes verification for a first time, storing, by the blockchain integrated station, the additional disk image in the trusted execution environment of the blockchain integrated station as the backup disk image.

8. The blockchain integrated station of claim 1, wherein the blockchain integrated station further comprises at least one of an intelligent network card or a smart contract processing chip, and wherein the blockchain integrated station comprises at least one of a certificate authority service, a standardized on-cloud service interface, or a standardized cross-chain service interface.

9. A computer-implemented method, comprising:
receiving, at least one processor of by a blockchain integrated station, a startup instruction for the blockchain integrated station to establish the blockchain integrated station as a blockchain node of a blockchain network;
in response to receiving the startup instruction, sending, by the at least one processor of the blockchain integrated station, a signature verification request for a disk image stored in the blockchain integrated station to a cryptographic acceleration card wherein a provider public key of a provider of the disk image is pre-stored in the cryptographic acceleration card, wherein the disk image comprises an executable file that enables the blockchain integrated station to be established as the blockchain node of the blockchain network to realize one or more functions of the blockchain node;
receiving, by the at least one processor of the blockchain integrated station, a signature verification result from the cryptographic acceleration card, wherein the signature verification result indicates whether a signature of the disk image passes a verification;
in response to determining that the signature verification result indicates that the signature of the disk image passes the verification, establishing the blockchain integrated station as the blockchain node of the blockchain network based on executing, by the at least one processor of the blockchain integrated station, the disk image that comprises the executable file; and
after establishing the blockchain integrated station as the blockchain node of the blockchain network, performing, by the blockchain integrated station, the one or more functions of the blockchain node that comprise contract creation and deployment and contract execution.

10. The computer-implemented method of claim 9, wherein the disk image comprises at least one of:

a binary disk image, wherein when the binary disk image is executed, the one or more functions of the blockchain node are added to the blockchain integrated station; or a platform disk image comprising the binary disk image, wherein when the platform disk image is executed, the one or more functions of the blockchain node and one or more additional functions different than the one or more functions of the blockchain node are added to the blockchain integrated station.

11. The computer-implemented method of claim 9, wherein the signature verification result is determined using the provider public key.

12. The computer-implemented method of claim 11, wherein the signature is generated by the provider of the disk image by signing the disk image using a provider private key, and wherein the provider private key and the provider public key are a pair of asymmetric keys.

13. The computer-implemented method of claim 9, wherein in response to determining that the signature verification result indicates that the signature of the disk image does not pass the verification, the computer-implemented method further comprises at least one of:
   requesting, by the blockchain integrated station, an additional disk image and an additional signature of the additional disk image from the provider of the disk image;
   terminating, by the blockchain integrated station, a startup process of the blockchain integrated station; or
   sending, by the blockchain integrated station, a warning of the disk image.

14. The computer-implemented method of claim 9, comprising:
   in response to determining that the signature verification result indicates that the signature of the disk image does not pass the verification, reading, by the blockchain integrated station, a backup disk image from a trusted execution environment of the blockchain integrated station;
   replacing, by the blockchain integrated station, the disk image with the backup disk image; and
   responding to the startup instruction again.

15. The computer-implemented method of claim 14, comprising:
   in response to receiving an additional signature verification result indicating that an additional signature of an additional disk image passes verification for a first time, storing, by the blockchain integrated station, the additional disk image in the trusted execution environment of the blockchain integrated station as the backup disk image.

16. The computer-implemented method of claim 9, wherein the blockchain integrated station further comprises at least one of an intelligent network card or a smart contract processing chip, and wherein the blockchain integrated station comprises at least one of a certificate authority service, a standardized on-cloud service interface, or a standardized cross-chain service interface.

17. A computer-implemented system, comprising:
   one or more blockchain integrated stations;
   one or more cryptographic acceleration cards respectively comprised in the one or more blockchain integrated stations; and
   one or more computer memory devices coupled with the one or more blockchain integrated stations and having tangible, non-transitory, machine-readable media storing one or more instructions that, when executed by the one or more blockchain integrated stations, perform one or more operations comprising:
      receiving, at least one processor of by a blockchain integrated station, a startup instruction for the blockchain integrated station to establish the blockchain integrated station as a blockchain node of a blockchain network;
      in response to receiving the startup instruction, sending, by the at least one processor of the blockchain integrated station, a signature verification request for a disk image stored in the blockchain integrated station to a cryptographic acceleration card, wherein a provider public key of a provider of the disk image is pre-stored in the cryptographic acceleration card, wherein the disk image comprises an executable file that enables the blockchain integrated station to be established as the blockchain node of the blockchain network to realize one or more functions of the blockchain node;
      receiving, by the at least one processor of the blockchain integrated station, a signature verification result from the cryptographic acceleration card, wherein the signature verification result indicates whether a signature of the disk image passes a verification;
      in response to determining that the signature verification result indicates that the signature of the disk image passes the verification, establishing the blockchain integrated station as the blockchain node of the blockchain network based on executing, by the at least one processor of the blockchain integrated station, the disk image that comprises the executable file; and
      after establishing the blockchain integrated station as the blockchain node of the blockchain network, performing, by the blockchain integrated station, the one or more functions of the blockchain node that comprise contract creation and deployment and contract execution.

18. The computer-implemented system of claim 17, wherein the disk image comprises at least one of:
   a binary disk image, wherein when the binary disk image is executed, the one or more functions of the blockchain node are added to the blockchain integrated station; or
   a platform disk image comprising the binary disk image, wherein when the platform disk image is executed, the one or more functions of the blockchain node and one or more additional functions different than the one or more functions of the blockchain node are added to the blockchain integrated station.

19. The computer-implemented system of claim 17, wherein the signature verification result is determined using the provider public key.

20. The computer-implemented system of claim 19, wherein the signature is generated by the provider of the disk image by signing the disk image using a provider private key, and wherein the provider private key and the provider public key are a pair of asymmetric keys.

21. The blockchain integrated station of claim 1, wherein the cryptographic acceleration card is configured to:
   receive the signature verification request for the disk image stored in the blockchain integrated station;
   obtained the signature verification result by performing a verification of the signature of the disk image; and send the signature verification result to the at least one processor of the blockchain integrated station.

\* \* \* \* \*